United States Patent [19]
Henderson et al.

[11] 3,868,266
[45] Feb. 25, 1975

[54] ALUMINA COATINGS FOR AN ELECTRIC LAMP

[75] Inventors: David C. Henderson, Chagrin Falls; Kenneth M. Maloney, Shaker Heights, both of Ohio

[73] Assignee: General Electric Company, Schenectady, N.Y.

[22] Filed: June 21, 1973

[21] Appl. No.: 372,132

[52] U.S. Cl............ 117/18, 117/46 FA, 117/46 FB, 117/46 FC, 117/46 FS, 117/96, 117/97, 117/106, 117/107.2, 117/159, 117/169 R
[51] Int. Cl............................................. C03c 17/06
[58] Field of Search....... 117/46 FA, 96, 97, 124 A, 117/124 C, 159, 169 R, 18, 46 FC, 46 FB, 46 FS, 107.2 R, 160 R, 106

[56] References Cited
UNITED STATES PATENTS
| | | | |
|---|---|---|---|
| 2,626,874 | 1/1953 | Pipkin | 117/46 FS |
| 2,848,819 | 8/1958 | Schoenfeld | 117/46 FA |
| 2,967,113 | 1/1961 | Liebhafsky et al | 117/46 FB |
| 3,607,343 | 9/1971 | Longo | 117/46 FS |

Primary Examiner—William D. Martin
Assistant Examiner—Janyce A. Bell
Attorney, Agent, or Firm—John F. McDevitt; Lawrence R. Kempton; Frank L. Neuhauser

[57] ABSTRACT

This invention relates to methods and materials for providing a light-diffusion coating in an electric lamp which comprises a thin layer of spherical alumina particles that have been vapor-deposited in a particular size range to provide more effective light scattering. The coatings are deposited upon the interior surface of the sealed glass envelope and have been found especially useful for incandescent lamps as well as for such other lamps as electric discharge lamps.

9 Claims, 1 Drawing Figure

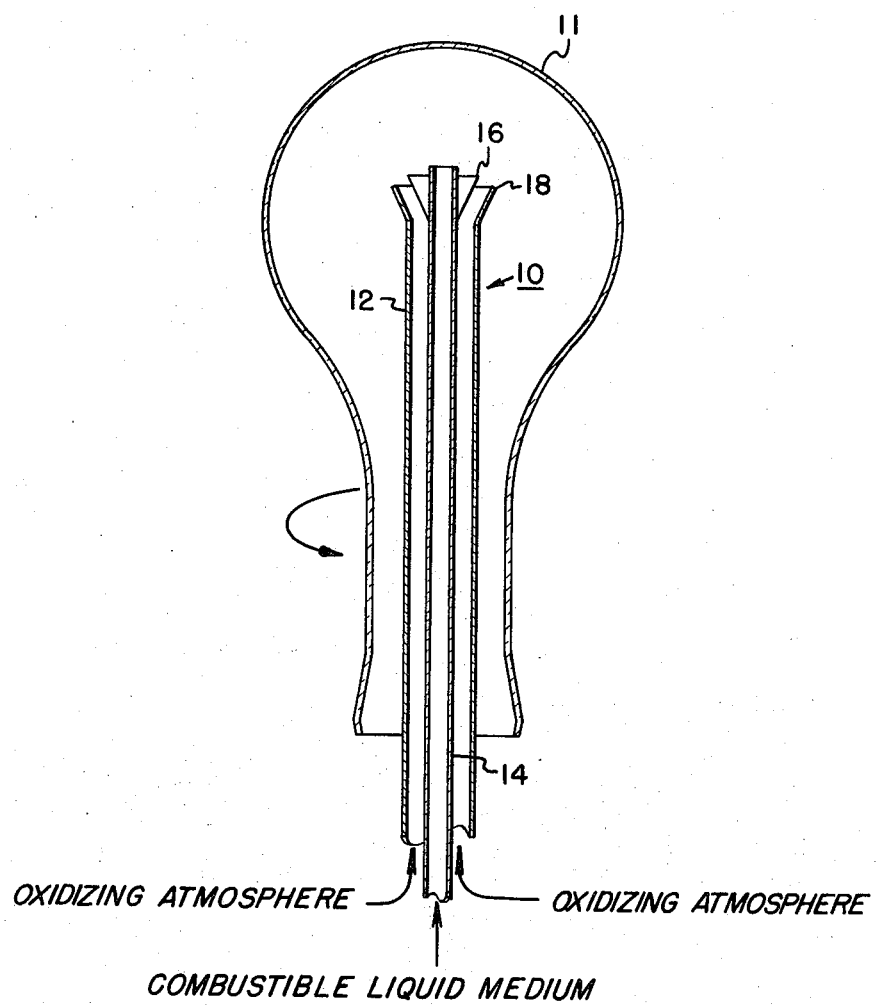

ALUMINA COATINGS FOR AN ELECTRIC LAMP

BACKGROUND OF THE INVENTION

A variety of materials and methods have been used heretofore to provide a light-diffusion layer upon the surface of the lamp glass envelope employed in electric lamps and the principal technique has been to deposit finely divided silica coatings upon the glass substrate which has been etched prior to coating. In U.S. Pat. No. 2,922,065 to Meister et al., there is described various methods of applying a low bulk density coating by vapor-deposition and other means including electrostatic coating upon the untreated internal surface of the lamp glass envelope of a number of materials including alkaline-earth and magnesium titanates, oxides, alumina, titania, and zirconium silicate. The light-scattering properties of these coatings is also described in the aforementioned patent and coatings having more effective light-scattering properties which can be applied during conventional lamp manufacture at high speeds are still being sought.

Improved light-diffusion coatings of spherical alumina particles having an individual particle size in the range from approximately 400 Angstroms to 5,000 Angstroms in diameter which scatter 99 percent or more of the incident visible radiation are described and claimed in our copending patent application Ser. No. 372,069, filed June 21, 1973 and now U.S. Pat. No. 3,843,206, and assigned to the assignee of the present invention. The present invention represents an alternate method of obtaining such improved coatings wherein a combustible liquid medium is employed as the starting material to form the spherical alumina particles which are vapor-deposited directly upon the untreated internal surface of the lamp glass envelope. In the preferred processes of the aforementioned copending application solid pellets of useful aluminum organic compounds provide the starting materials which are burned in a moving oxidizing gas stream within the lamp glass envelope to vapor deposit the desired alumina coatings. The useful aluminum organic compounds which can be employed in the practice of both inventions can be either liquids or solids having boiling or sublimation temperatures below the combustion temperatures. Such materials include two classes of chemical compounds; namely, the aluminum alkyls and the aluminum alkoxides wherein all of the carbon atoms are saturated, hence will burn cleanly with a minimum of oxygen and no external heat being needed. Unsaturated aluminum organic compounds have a tendency to produce a dirty flame and require more oxygen along with another flammable compound in order to completely burn the carbon produced upon combustion. While the alkyl compounds of aluminum such as trimethyl aluminum or triethyl aluminum are commercially available, there would be a serious disadvantage to their use in practicing the respective inventions since these materials are pyrophoric and burn spontaneously in air thereby requiring special precautions for their use and handling. On the other hand, the more desirable aluminum alkoxide compounds have the advantage of being relatively stable in dry air or oxygen and ignite only at relatively high temperatures or when placed in direct contact with a flame. In air, these compounds burn quite slowly but in pure oxygen a rapid burning rate is obtained to form anhydrous aluminum oxide. While the proportion of aluminum oxide thereby obtained is dependent upon the organic group, the preferred alkoxides can illustratively contain short-chain alkyl groups including n-propyl, sec-propyl; n-, sec-, and t-butyl; n-, sec-, and t-amyl; along with such higher order groups as hexyl and heptyl.

SUMMARY OF THE INVENTION

It has been discovered by the applicants, that a combustible liquid medium can be employed containing either a soluble aluminum organic compound dissolved in an organic solvent or an organic aluminum compound which is liquid at ordinary temperatures to provide an appropriate starting material which is burned in an oxidizing atmosphere to form the desired alumina coatings. More particularly, the present method comprises forming a combustible liquid medium with an organic aluminum compound, burning said combustible liquid medium within the lamp glass envelope and utilizing the oxidizing atmosphere to form a moving gas stream having the spherical alumina particles suspended therein, and controlling the flow rate of said moving gas stream within the lamp glass envelope to uniformly deposit the alumina particles upon the untreated internal surface of the lamp glass envelope. As exemplary of one type of the combustible liquid medium, a soluble organic aluminum compound such as aluminum isopropoxide can be dissolved in an organic solvent such as isopropanol to form a 50 weight percent solution and kept heated at approximately 60° Centigrade as the fuel supply to a particular burner design hereinafter more fully described which is particularly adapted to impart a directional flow to the moving gas stream for improved deposition of the present alumina coatings. Alternately, aluminum sec-butoxide is a liquid at room temperature, hence can be fed through the burner without heating as the fuel supply with comparable results. In its preferred embodiments, the combustible liquid medium is supplied along with oxygen while said burner is disposed within the lamp glass envelope and the lamp glass envelope is rotated in a direction opposed to the directional flow of the moving gas stream which flows in a tangential direction to the internal surface of said lamp glass envelope. By regulating the flow rate of the gas stream containing the suspended spherical alumina particles in this manner, it then becomes possible to minimize the velocity of said suspended alumina particles adjacent the surface of the lamp glass envelope and thereby obtain a coating of greater thickness than can ordinarily be obtained with the same amount of starting aluminum organic compound.

BRIEF DESCRIPTION OF THE DRAWING

The drawing represents a diagrammatic cross-section of the method and means whereby the present coatings are deposited.

DESCRIPTION OF THE PREFERRED EMBODIMENTS

In one of its aspects, the present light-diffusion coatings can be deposited directly upon the untreated internal surface of the lamp glass envelope prior to its assembly as an electric incandescent lamp. More particularly, a lamp of this type comprises a seal glass envelope, a pair of lead-in wires sealed into said envelope and a tungsten filament coil in said envelope connected to said lead-in wires, with said lead-in wires being further electrically connected at the other end to a suitable lamp base. To deposit the coating on the interior bulb wall prior to such lamp manufacture, the combustible liquid medium is burned inside the bulb utilizing an amount of the starting material dependent upon the coating weight desired. For example, 0.8 grams of aluminum secbutoxide was supplied to the burner design hereinafter described more fully along with oxygen at a volume flow rate of approximately 10 liters/minute to coat the interior surface of a 100-watt incandescent lamp bulb upon ignition of the burner at a coating weight of approximately 35 mg. Alternately, approximately 1.2 grams of a 50 percent by weight aluminum isopropoxide solution in isopropanol provided comparable results when heated and fed to the burner at the otherwise same operating conditions. In carrying out the present method, it was also observed that the coating weight with a given amount of aluminum organic compound in the combustible liquid medium could be increased within limits at lower oxygen flow rates during the combustion process. More particularly, while the burning time periods for the coating weights reported above range from about 10–20 seconds, it was learned that a reduced oxygen flow rate during the combustion process from that employed would extend the burning time and also deposit heavier coatings. It was further discovered that rotating the lamp glass envelope during said deposition in an opposite direction to the flow of the moving gas stream produced heavier coatings for the same burner operating conditions than could be obtained when the tangential flow of the gas stream containing the suspended alumina particles was in the same general direction as the rotational direction of the lamp glass envelope.

The accompanying drawing represents a diagrammatic cross-section of a preferred burner design which can be employed to deposit the present coatings starting with a combustible liquid medium containing the organic aluminum compound. More particularly, a burner 10 is depicted having a size and contour selected for placement within the open end of the lamp glass envelope 11 which is rotatably mounted thereon by conventional means not shown. Said burner is constructed having a tubular body portion 12 which contains an inner feed tube 14 of smaller diameter aligned coaxially therewith to provide an annular space therebetween for passage of an oxidizing atmosphere through the burner. At the exhaust end or nozzle of said burner, a baffle member 16 is affixed to the fuel tube 14 in order to impart a swirling motion to the emerging gas flow in a general direction opposite to the counterclockwise rotation of the lamp glass envelope as shown by an arrow on the drawing. The swirling motion is imparted by further cooperation of a flared end 18 at the burner nozzle which assists in changing the vertical direction of gas flow emerging from the burner and provide rotation of said gas flow tangential to the internal surface of the lamp glass envelope. The combustible liquid medium is fed continuously to said burner during the deposition process along with an oxidizing atmosphere being supplied to the annular passageway and preformed non-spherical alumina particles can also be suspended in said moving gas stream by conventional means not shown. Mixing of such preformed non-spherical alumina particles with the alumina vapor formed by combustion of the solid aluminum organic compound takes place at the burner nozzle to provide a uniform dispersion of all suspended alumina material.

In operation, the combustion process can be initiated by igniting the combustible liquid medium with conventional means and starting the flow of an oxidizing atmosphere through the burner. Such operation can be conducted automatically on high speed manufacturing equipment wherein the burner actuation is accomplished concurrently with lowering the lamp glass envelope for rotation over the burner. The combustion process generates sufficient heating of suspended material in the moving gas stream along with the glass substrate so that no additional heating is required to obtain an adherent coating on the bulb wall. By further regulating the velocity flow rate of the oxidizing atmosphere to the burner with respect to the rotational velocity of the lamp glass envelope, there can be established a minimal velocity gradient between the interior surface of the lamp glass envelope and the suspended aluminum material at some point adjacent to said surface for increased deposition efficiency in the manner previously indicated. The deposits obtained in this way have also been found more uniform along the bulb wall profile than was obtained without regulation of said velocity gradient as by rotating the lamp glass envelope in the same clockwise direction as the flow direction of the gas stream emerging from the burner.

It will be apparent from the foregoing description that a generally improved method has been provided for depositing light-diffusion alumina coatings having use in various electric lamps. It will also be apparent that modifications can be made in the present method without departing from the true spirit and scope of this invention. For example, various dopants and other additives can be incorporated in the combustible liquid medium to provide different colors or decorative effects using the same general deposition process. Likewise, the desired relationship in gas flow direction and velocity during the deposition process can be obtained in burner designs other than herein specifically disclosed. Consequently, it is intended to limit the present invention only by the scope of the appended claims.

What we claim as new and desire to secure by Letters Patent of the United States is:

1. A method of depositing a light-diffusion coating upon the internal surface of a lamp glass envelope which comprises:
   a. forming a combustible liquid medium with a liquid organic aluminum compound or by dissolving a solid organic aluminum compound in an organic liquid solvent
   b. burning said combustible liquid medium within the lamp glass envelope utilizing an oxygen containing atmosphere to form a moving gas stream having spherical alumina particles with an individual particle size range from approximately 400 A to 5,000 A in diameter being suspended in said gas stream, and
   c. controlling the flow rate of the moving gas stream within the lamp glass envelope to uniformly deposit the alumina particles upon the untreated internal surface of the lamp glass envelope.

2. A method as in claim 1 wherein the oxygen containing atmosphere is oxygen at a predetermined flow rate.

3. A method as in claim 1 utilizing a burner construction to impart a flow direction to the moving gas stream which is substantially tangential to the internal surface of the lamp glass envelope.

4. A method as in claim 3 wherein the lamp glass envelope is rotated in a direction opposite to the flow direction of the moving gas stream.

5. A method as in claim 1 wherein the combustible liquid medium comprises aluminum sec-butoxide.

6. A method as in claim 1 wherein the combustible liquid medium comprises a heated solution of aluminum isopropoxide dissolved in isopropanol.

7. A method of depositing a light-diffusion coating upon the internal surface of a lamp glass envelope which comprises:
   a. dissolving a short-chain aluminum organic compound in an organic liquid solvent to form a combustible liquid medium,
   b. disposing a burner construction within the lamp glass envelope and rotating the lamp glass envelope,
   c. concurrently feeding a stream of said combustible liquid medium to said burner construction along with oxygen to form an ignitable mixture and igniting said mixture to provide a heated gas stream having suspended therein spherical alumina particles with an individual particle size range from approximately 400 A to 5,000 A in diameter,
   d. introducing non-spherical alumina particles to said burner for suspension in said moving gas stream,
   e. causing the moving gas stream to flow in a direction opposed to said rotation and tangential to the internal surface of the lamp glass envelope,
   f. regulating the velocity flow rate of said gas stream with respect to the rotational velocity of said interior surface of the lamp glass envelope so that a minimal velocity gradient exists therebetween adjacent said internal surfaces, and
   g. uniformly codepositing said non-spherical alumina particles with said spherical alumina particles upon the untreated internal surface of the lamp glass envelope.

8. A method as in claim 7 wherein the combustible liquid medium comprises aluminum sec-butoxide.

9. A method as in claim 7 wherein the combustible liquid medium comprises a heated solution of aluminum isopropoxide dissolved in isopropanol.

* * * * *